(12) United States Patent
Yamanashi (10) Patent No.: US 10,102,867 B2
(45) Date of Patent: Oct. 16, 2018

(54) TELEVISION SYSTEM, SERVER APPARATUS, AND TELEVISION APPARATUS

(71) Applicant: Kabushiki Kaisha Toshiba, Minato-ku, Tokyo (JP)

(72) Inventor: Naoki Yamanashi, Tokyo (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 0 days.

(21) Appl. No.: 15/013,440

(22) Filed: Feb. 2, 2016

(65) Prior Publication Data

US 2016/0148623 A1    May 26, 2016

Related U.S. Application Data

(63) Continuation of application No. PCT/JP2013/084927, filed on Dec. 26, 2013.

(51) Int. Cl.
*H04N 7/173* (2011.01)
*G10L 21/028* (2013.01)
(Continued)

(52) U.S. Cl.
CPC ......... *G10L 21/028* (2013.01); *H04N 21/233* (2013.01); *H04N 21/439* (2013.01);
(Continued)

(58) Field of Classification Search
CPC .................. H04N 21/233; H04N 21/4394
See application file for complete search history.

(56) References Cited

U.S. PATENT DOCUMENTS 9,224,392 B2    12/2015    Hirohata
2007/0044137 A1*    2/2007    Bennett .................. G10H 1/366
725/141
(Continued)

FOREIGN PATENT DOCUMENTS

JP    2002-159099 A    5/2002
JP    2003-259245 A    9/2003
(Continued)

OTHER PUBLICATIONS

English translation of Written Opinion mailed by the International Bureau of WIPO dated Apr. 1, 2014 in the corresponding PCT Application No. PCT/JP2013/084927—9 pages.
(Continued)

*Primary Examiner* — Olugbenga O Idowu
(74) *Attorney, Agent, or Firm* — Knobbe, Martens, Olson & Bear, LLP (57) ABSTRACT

According to one embodiment, a server apparatus includes a content provision module which selectively provides a plurality of items of content, and an audio source separation module which separates a voice component and a background sound component from an audio signal of the content, and sets different levels of volume, and a television apparatus connected to the server apparatus through a network includes an instruction module which instructs selection of the content to the content provision module of the server apparatus and instructs execution of an audio source separation process to the audio source separation module, and a playback module which plays back the content provided from the server apparatus in response to the instruction.

6 Claims, 4 Drawing Sheets

(51) Int. Cl.
  *H04N 21/233* (2011.01)
  *H04N 21/439* (2011.01)
  *H04N 21/81* (2011.01)
  *G10L 21/0316* (2013.01)
  *G10L 21/034* (2013.01)
(52) U.S. Cl.
  CPC ..... *H04N 21/4394* (2013.01); *H04N 21/8113* (2013.01); *G10L 21/034* (2013.01); *G10L 21/0316* (2013.01)

(56) References Cited

U.S. PATENT DOCUMENTS

| | | | |
|---|---|---|---|
| 2009/0132245 A1 | 5/2009 | Wilson et al. | |
| 2010/0014693 A1* | 1/2010 | Park | G06Q 30/0601 381/119 |
| 2012/0023164 A1 | 1/2012 | Matsunaga | |
| 2013/0035933 A1* | 2/2013 | Hirohata | G10L 15/20 704/206 |

FOREIGN PATENT DOCUMENTS

| | | |
|---|---|---|
| JP | 2005-071090 A | 3/2005 |
| JP | 2009-128906 A | 6/2009 |
| JP | 2010-512042 A | 4/2010 |
| JP | 2012-208737 A | 10/2012 |
| JP | 2013-037152 A | 2/2013 |
| JP | 2013-050604 A | 3/2013 |
| WO | WO 2010/109768 A1 | 9/2010 |

OTHER PUBLICATIONS

International Search Report mailed by Japan Patent Office dated Apr. 1, 2014 in the corresponding PCT Application No. PCT/JP2013/084927—8 pages.

Written Opinion mailed by Japan Patent Office dated Apr. 1, 2014 in the corresponding PCT Application No. PCT/JP2013/084927—7 pages.

\* cited by examiner

TELEVISION SYSTEM, SERVER APPARATUS, AND TELEVISION APPARATUS

CROSS REFERENCE TO RELATED APPLICATIONS

This application is a Continuation Application of PCT Application No. PCT/JP2013/084927, filed Dec. 26, 2013, the entire contents of which are incorporated herein by reference.

FIELD

Embodiments described herein relate generally to a television system which reproduces content provided from a server apparatus by a television apparatus, and particularly, to a process of reproducing acoustic signals.

BACKGROUND

Recently, in a technology of reproducing acoustic signals, an audio source separation process of separating voice and sound of the other voice (background sound) and setting the volume separately has been put into practical use, and in a television apparatus, installing an audio source separation function is considered as an option of audio playback. With the audio source separation function, a voice can be separated into a voice component and a background sound component which constitute an audio source of an audio signal at a specified ratio, and can be played back. This function can clarify a voice sound by reducing the background sound in accordance with the substance of the content, or enabling karaoke by canceling voices, so that audio playback that suits the need of each viewer can be realized.

However, if an audio source separation function is provided in a television apparatus, a cost of the television apparatus is increased. Hence, executing the audio source separation process outside the television apparatus is desired.

BRIEF DESCRIPTION OF THE DRAWINGS

A general architecture that implements the various features of the embodiments will now be described with reference to the drawings. The drawings and the associated descriptions are provided to illustrate the embodiments and not to limit the scope of the invention.

DETAILED DESCRIPTION

Various embodiments will be described hereinafter with reference to the accompany drawings.

In general, according to one embodiment, there are provided a server apparatus comprises: a content provision module configured to selectively provide a plurality of items of content; and an audio source separation module configured to separate a voice component and a background sound component from an audio signal of the items of content, and to set different levels of volume. Further, a television apparatus connected to the server apparatus through a network comprises: an instruction module configured to instruct selection of the content to the content provision module of the server apparatus and to instruct execution of an audio source separation process to the audio source separation module; and a playback module configured to play back the content provided from the server apparatus in response to the instruction.

Figure 1:
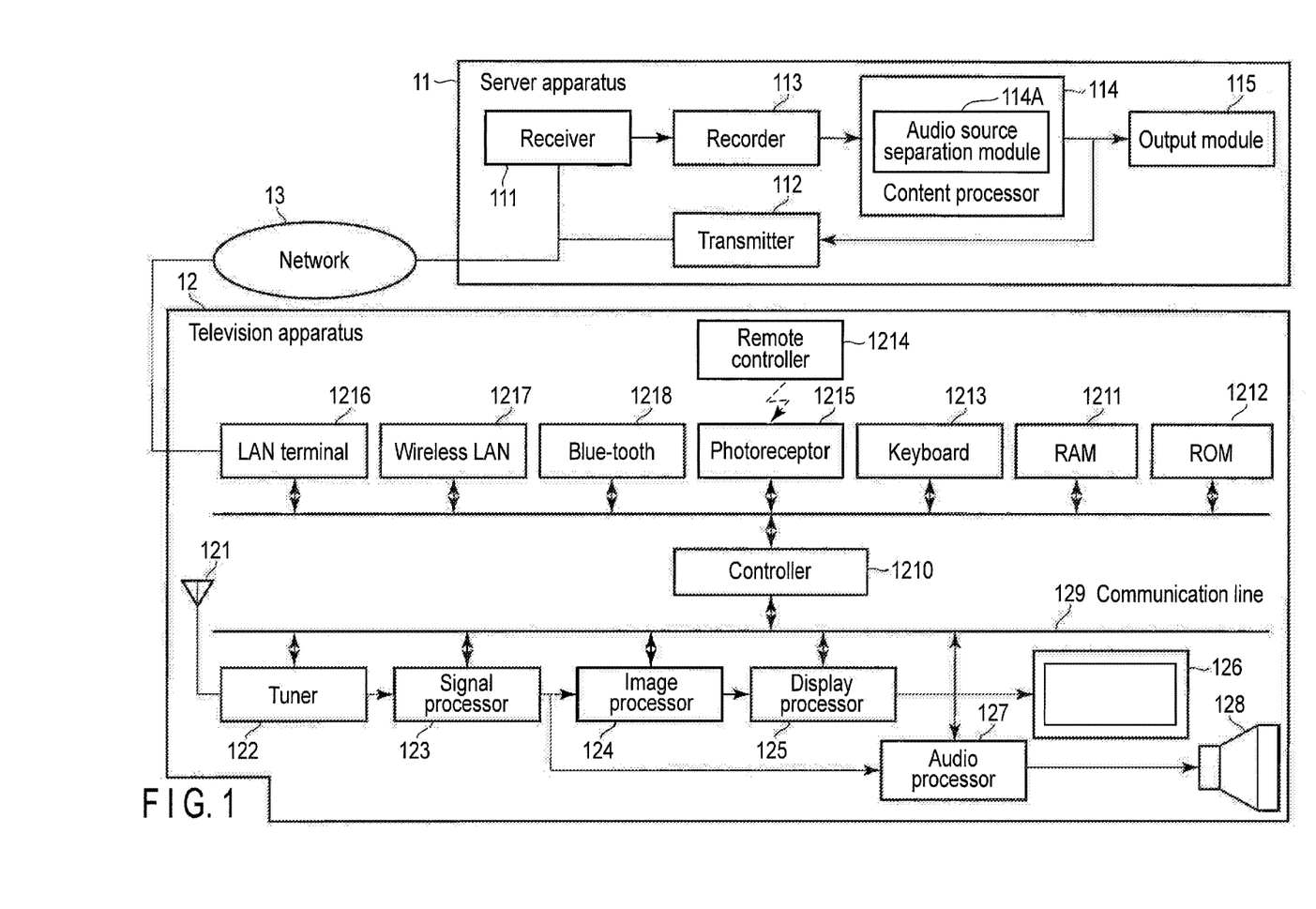
FIG. 1 is a block diagram which shows a structure of a television system according to an embodiment.

FIG. 1 is a block diagram which schematically shows a television system according to an embodiment. As shown in FIG. 1, the system is a structure in which a server apparatus 11 and a television apparatus 12 are connected through a network 13. In the drawing, although one television apparatus 12 is connected to the network 13, a structure in which a plurality of television apparatuses are connected may be adopted as the system. Also, in the following descriptions, audio content is intended as a file containing voice, and video may also be included as the content. However, in order to simplify the description, a process of video is omitted.

In FIG. 1, the server apparatus 11 is connected to the network 13, and comprises a receiver 111 and a transmitter 112 which carry out data transmission and reception with the television apparatus 12. Also, the server apparatus 11 comprises a recorder 113, a content processor 114, and a monitor output module 115.

The recorder 113 comprises a recording device such as a hard disk, etc., for storing content such as television programs. The content processor 114 receives instruction data transmitted from the television apparatus 12 on the network 13 through the receiver 111, and performs a decode process on stream data by reading the corresponding content from the recorder 113 based on the instruction data. Further, as one function of the process, an audio source separation module 114A is provided.

The audio source separation module 114A analyzes an audio source of a decoded audio signal, separates the audio source into voice and background sound, and sets and outputs the volume at a specified ratio, in accordance with an audio source control instruction in the instruction data. The output module 115 outputs to a monitor the stream data decoded by the content processor 114. Also, the stream data obtained by the content processor 114 is transmitted to the television apparatus 12, which requested this, through the transmitter 112.

The television apparatus 12 is equipped with a digital broadcast receiving tuner 122. The tuner 122 selects a channel CH for view instructed by a user and demodulates it among kinds of digital broadcasting, such as BS, CS, and terrestrial waves received by an antenna 121 in the drawing. The demodulated broadcast signal of the channel is retrieved and processed as various digital signals by a signal processor 123. An image signal is adjusted to fit to a correct screen size by an image processor 124, character information graphics are further superimposed on the image signal by a display processor 125, and the image is displayed on screen by a display 126. Also, an audio signal is sound processed and amplified by an audio processor 127, and is output as audio by a speaker 128.

Devices such as the aforementioned elements 122, 123, 124, 125, and 127 are controlled by a controller (a microcomputer) 1210 via a communication line 129 such as an IIC-BUS, and they transfer and receive data. Also, other than the above, a RAM 1211, a ROM 1212, a keyboard 1213, and a photoreceptor (a remote controller receiver) 1215 which receives a signal from a remote controller 1214 are connected to the television apparatus 12, and each of them transfers and receives a signal or data. The television apparatus 12 also includes a LAN terminal 1216, a wireless LAN transmission and reception module 1217, and a Bluetooth transmission and reception module 1218, and those elements can control the television likewise the remote controller 1214 by establishing a network communication externally. Although the television apparatus 12 does not have an audio source separation function in the audio processor 127, an audio source separation instruction function for instructing an audio source separation process is provided in the audio source separation module 114A mounted in the server apparatus 11.

In the above structure, the audio source separation module 114A mounted in the server apparatus 11 will be described specifically.

The audio source separation module 114A of the present embodiment corresponds to a technology which uses non-negative matrix factorization, and the audio source separation module 114A creates a first basic matrix representing a feature of a background sound signal from a spectrogram (a spectrum feature) of an audio signal in a zone in which the probability that a background sound signal will be included is high. Further, by utilizing a voice likelihood representing the likelihood that a voice signal will be included, a second basic matrix is created by excluding a component that is highly related to the voice signal from the first basic matrix. A third basic matrix representing a feature of a voice signal, and a first coefficient matrix are calculated by using the second basic matrix, and by the product of the third basic matrix and the first coefficient matrix, a spectrogram of a voice signal is estimated. Finally, by converting the estimated spectrogram of the speech signal into a time signal, the speech signal is separated from the audio signal.

As described above, the audio source separation module 114A of the present embodiment creates the second basic matrix in which a component that is highly related to the voice signal is excluded from the first basic matrix of the background sound signal which has been created. In this way, a basic matrix which accurately represents the feature of a background sound signal can be created, and as a result, a capability of separating the voice signal can be improved.

Figure 2:
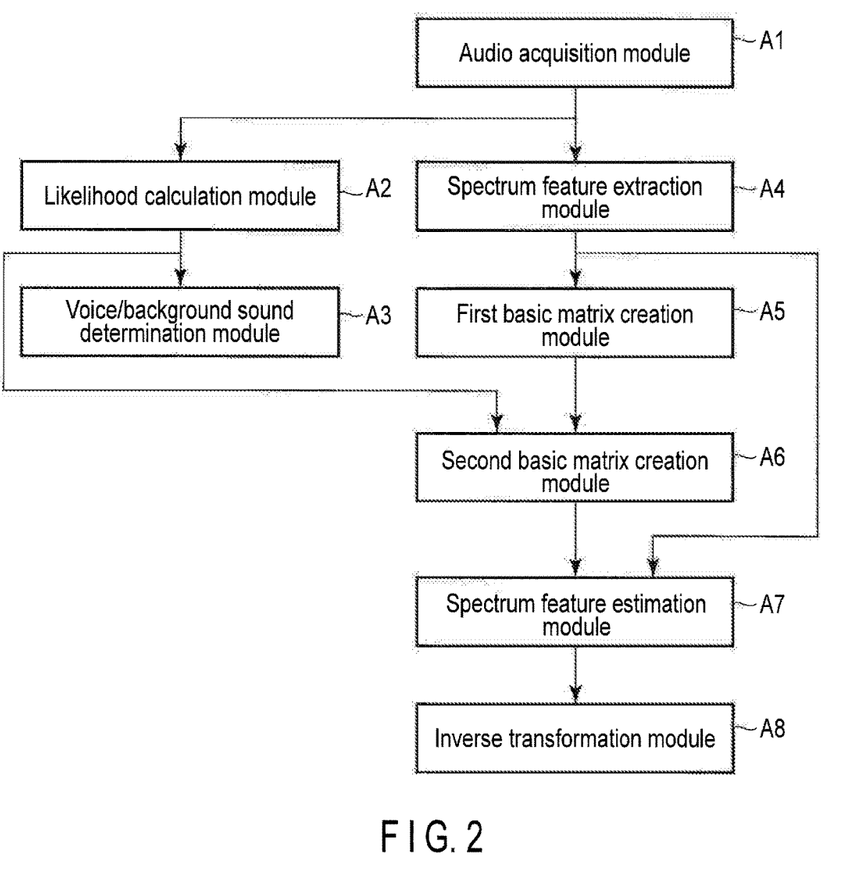
FIG. 2 is a functional block diagram showing a structure of an audio source separation module for use in the system shown in FIG. 1.

FIG. 2 is a block diagram showing a structure of the audio source separation module 114A. The audio source separation module 114A comprises a audio acquisition module A1, a likelihood calculation module A2, a voice/background sound determination module A3, a spectrum feature extraction module A4, a first basic matrix creation module A5, a second basic matrix creation module A6, a spectrum feature estimation module A7, and an inverse transformation module A8.

The audio acquisition module A1 acquires an audio signal including a voice signal and a background sound signal. The likelihood calculation module A2 extracts an acoustic feature representing features of the voice signal and the background sound signal from the audio signal, and by utilizing this acoustic feature, a voice likelihood representing the likelihood that the voice signal will be included in the audio signal, and a background sound likelihood representing the likelihood that the background sound signal will be included are calculated. The voice/background sound determination module A3 uses the voice likelihood and the background sound likelihood to discriminate between voice and background sound for each of a predetermined zone of the audio signal. The spectrum feature extraction module A4 performs Fourier transform of the audio signal, and extracts the spectrogram. The first basic matrix creation module A5 uses the spectrogram extracted from the audio signal including a zone determined as corresponding to the background sound signal, and creates the first basic matrix representing the feature of the background sound signal.

The second basic matrix creation module A6 uses the voice likelihood and creates the second basic matrix by excluding a component of a column vector that is highly related to the voice signal from the first basic matrix. The spectrum feature estimation module A7 performs non-negative matrix factorization of the spectrogram by using the second basic matrix, thereby calculating the third basic matrix representing the feature of a voice signal and the first coefficient matrix, and estimating the spectrogram of the voice signal included in the audio signal by the product of the third basic matrix and the first coefficient matrix. The inverse transformation module A8 converts the estimated spectrogram of the voice signal into a time signal by inverse Fourier transform.

In the audio source separation module 114A according to the above structure, the sound acquisition module A1 acquires the audio signal read from the recorder 113, or the acoustic signal transmitted from the television apparatus 12 connected by way of the receiver 111.

The likelihood calculation module A2 extracts the acoustic feature representing the feature of the audio signal and the background sound signal from the audio signal acquired by the audio acquisition module A1. Further, the likelihood that the audio signal includes the voice signal (the voice likelihood) and the likelihood that the audio signal includes the background sound signal (the background sound likelihood) are calculated by using this acoustic feature.

Specifically, the likelihood calculation module A2 divides the audio signal into frames having the length of 25 ms (400 samples), and in which the interval is 8 ms (128 samples). A Hamming window is used for frame division. Next, an acoustic feature is extracted from each of the frames. As the acoustic feature, not only the spectrum obtained by performing the Fourier transform of the audio signal of each frame, but also the feature of a spectrogram system such as LPC spectrogram and MFCC can be used. Further, by checking the extracted acoustic feature against the already learned voice model and background sound model, the voice likelihood and the background sound likelihood of each frame are calculated.

The voice/background sound determination module A3 uses the voice likelihood and the background sound likelihood of each frame calculated by the likelihood calculation module A2 to determine whether the voice signal is voice or background sound for each of the predetermined zone. In the present embodiment, the length of the predetermined zone is set to 400 ms (corresponding to 50 frames). The voice/background sound determination module A3 calculates the average value of the voice likelihood and the background sound likelihood for 50 frames, and discriminates between voice and background sound by comparing the levels of those likelihoods. Alternatively, each of the average values may be compared with a preset threshold to discriminate between voice and background sound.

The spectrum feature extraction module A4 divides the acoustic signal into frames having the length of 25 ms (400 samples), and in which the interval is 8 ms (128 samples), and extracts the spectrum by performing the Fourier transform (frequency analysis) of the audio signal of each frame. Note that in the present embodiment, after performing zero padding of 112 points for each frame, discrete Fourier transform of 512 points is executed.

The first basic matrix creation module A5 uses the spectrum (spectrogram) of a plurality of frames extracted by the spectrum feature extraction module A4, and creates a first basic matrix H representing the feature of the background sound signal. Here, in the present embodiment, the first basic matrix H is created by using the spectrogram extracted from the audio signal of the zone determined as corresponding to background sound by the voice/background sound determination module A3.

First, the first basic matrix creation module A5 creates a matrix Z with F rows and T columns in which the entire elements of each F-dimension spectrum that is extracted from T frames are stored. Next, this matrix Z is approximated by the product of the first basic matrix H with F rows and D columns and a coefficient matrix U with D rows and T columns. Here, D represents the number of a base, and is set to 32 empirically. The first basic matrix H and the coefficient matrix U are derived by iteration based on the product of the first basic matrix H and the coefficient matrix U, and a square error of the matrix Z. At this time, random values may be used for an initial matrix of the first basic matrix H and the coefficient matrix U.

The second basic matrix creation module A6 uses the voice likelihood calculated by the likelihood calculation module A2 and creates a second basic matrix B by excluding a component of a column vector that is highly related to the voice signal from the first basic matrix H. In this way, the second basic matrix B representing the characteristics of the background sound signal can be accurately created.

The spectrum feature estimation module A7 performs non-negative matrix factorization of the spectrum feature extracted by the spectrum feature extraction module A4 by using the second basic matrix B, thereby calculating a third basic matrix M representing the feature of the voice signal and a first coefficient matrix V. Further, by obtaining the product of the third basic matrix M and the first coefficient matrix V, the spectrum feature of the voice signal included in the audio signal is estimated.

The inverse transformation module A8 converts the estimated spectrogram of the voice signal into a time signal by inverse discrete Fourier transform. In this way, the voice signal can be separated from the audio signal.

Figure 3:
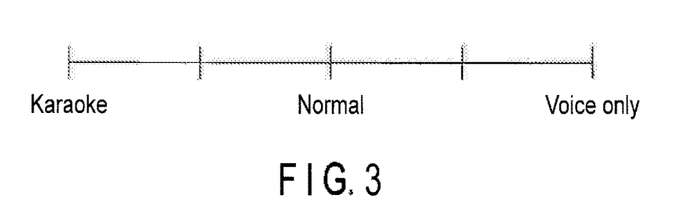
FIG. 3 is a diagram for describing a function of the audio source separation module shown in FIG. 2.

As shown in FIG. 3, the audio source separation module 114A according to the above structure has the function of a normal mode (in which the volume of voice and background sound is equally output), a voice mode (in which background sound is completely suppressed), and a karaoke mode (in which voice is completely suppressed). As described above, because of a volume adjustment mode based on a plurality of scales, the user can instruct which of the modes should be selected or the ratio of the suppressing to the server apparatus 11 through the television apparatus 12.

Figure 4:
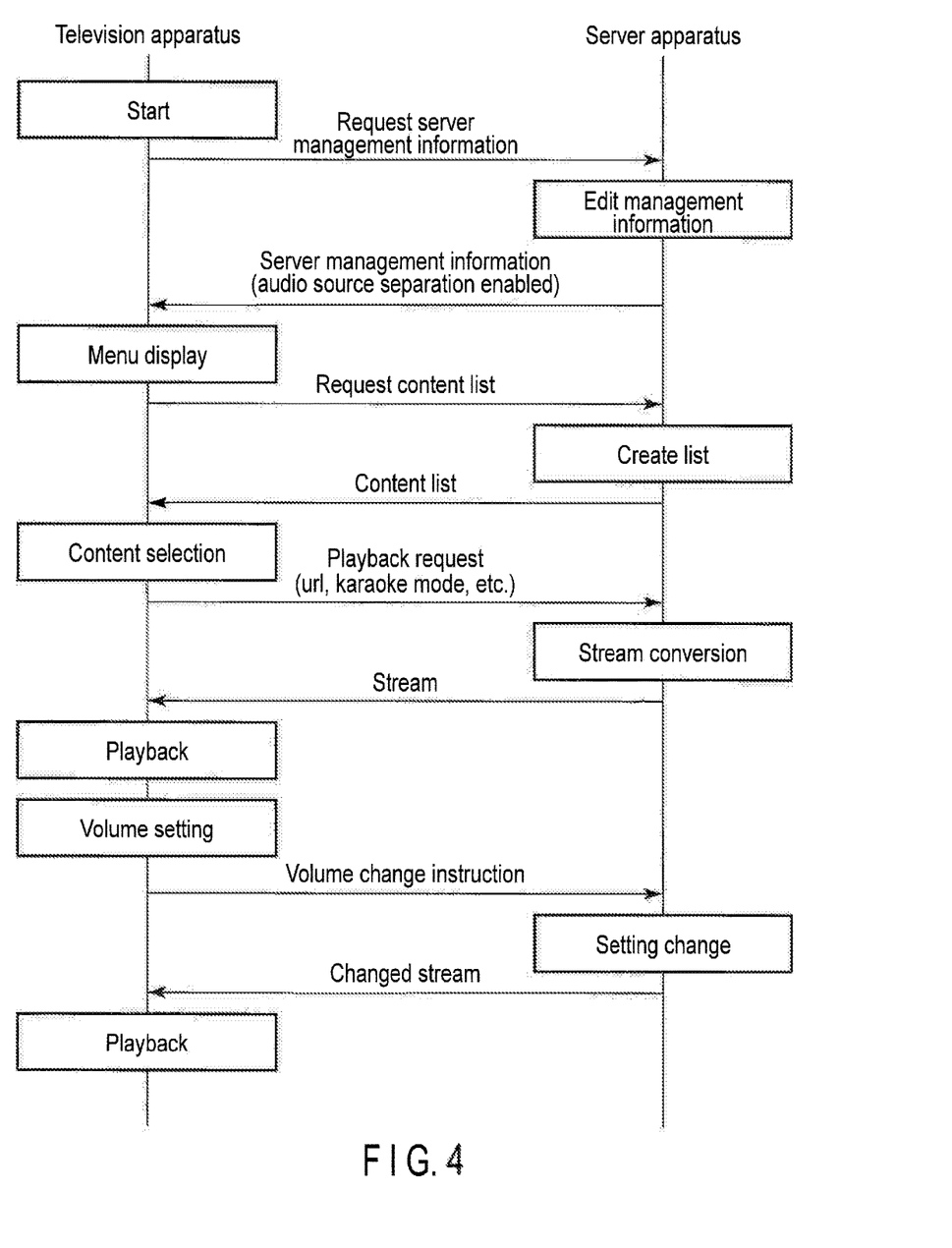
FIG. 4 is a sequence diagram showing a procedure between a television apparatus and a server apparatus when an audio source separation process is executed in the system shown in FIG. 1.

In the system shown in FIG. 1, by referring to a sequence diagram shown in FIG. 4, a procedure between the television apparatus and the server apparatus when the audio source separation process is executed will be described.

First, at the time when the television apparatus 12 is started or at regular intervals, or when a device list is opened, the television apparatus 12 requests server management information indicating a list of functions provided in the server apparatus 11 to the server apparatus 11. In response to the request, the server apparatus 11 returns the server management information including the audio source separation function to the television apparatus 12. When the television apparatus 12 acquires the server management information, a function list shown in the information is displayed on a menu screen.

Here, when a content list is requested from the television apparatus 12 to the server apparatus 11 by the user's operation, the server apparatus 11 creates a list of content items recorded in the recorder 113 and returns it to the television apparatus 12.

Figure 5:
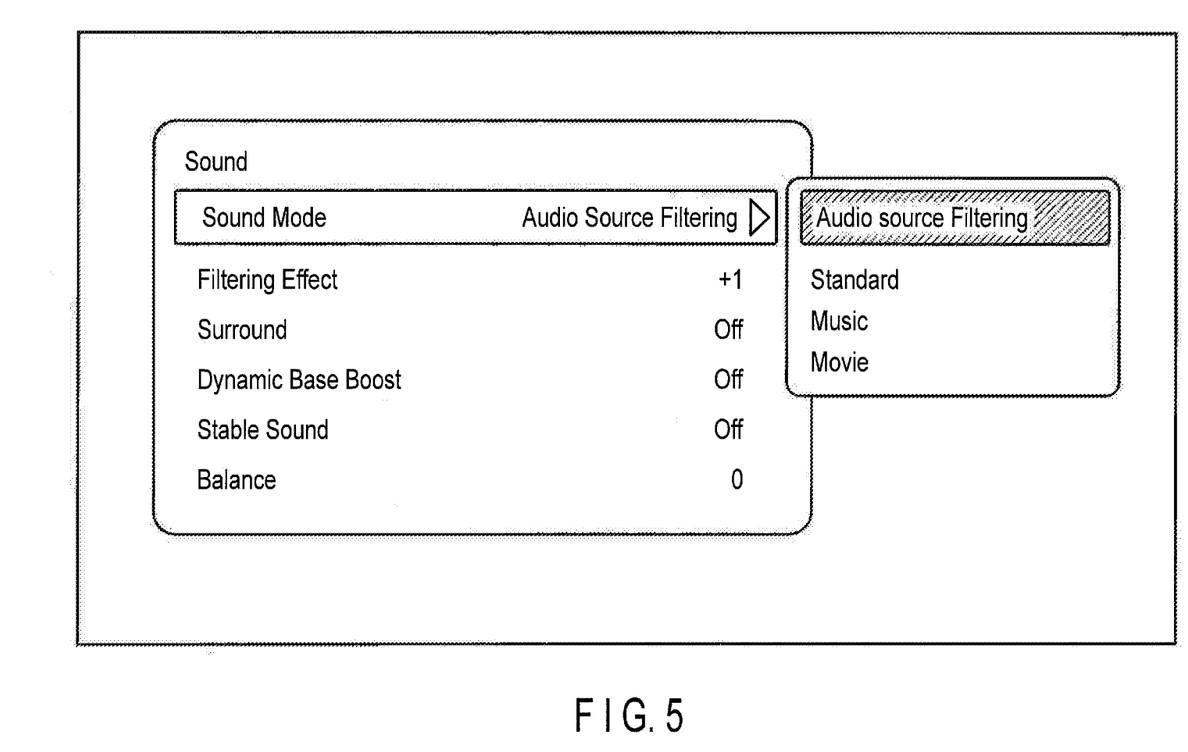
FIG. 5 is a diagram showing a menu screen for notifying the server apparatus of a process instruction of the audio source separation process made at the television apparatus side in the system shown in FIG. 1.

When the television apparatus 12 receives the content list, the television apparatus 12 displays a content selection screen based on that list. At this time, as an option, a menu screen (display of the volume adjustment mode based on a plurality of scales shown in FIG. 3) for using the audio source separation function is also presented. FIG. 5 shows an example of the menu screen. When the user selects by an operation an arbitrary item of content and the volume adjustment mode from the selection screen, a reproduction request of the content is transmitted to the server apparatus 11 together with a selection instruction of a audio source separation mode. When the server apparatus 11 receives the content reproduction request and the selection instruction of the volume adjustment mode, the server apparatus reads the corresponding content and coverts that content into stream data. At this time, when the volume adjustment mode is selected by the instruction, the corresponding audio source separation process is executed at the time when the read content is converted into stream data, and the volume is set at a ratio corresponding to the specified mode. The stream data created in this way is sent to the television apparatus 12 that requested it.

When the television apparatus 12 receives the stream data of the requested content, the television apparatus 12 plays back and outputs the stream data. In this state, when an instruction of changing the volume adjustment mode is made by the user, the change instruction is notified to the server apparatus 11, and the server apparatus 11 changes the volume adjustment mode in the audio source separation process based on the change instruction, creates stream data with the volume based on a ratio according the mode change instruction, and transmits it to the television apparatus 12.

By the above processing, even if the television apparatus 12 is not provided with an audio source separation function, since the server apparatus 11 has the audio source separation function, it is possible to keep down the cost of the television apparatus 12, and also respond to the need of the user who wishes to use the audio source separation function.

Here, in the present embodiment, as the server apparatus 11 is structured to provide information indicating that the audio source separation function is provided in the server apparatus 11 via a network, the television apparatus 12 on the client side can inform the user of the fact that the server apparatus 11 is equipped with the audio source separation function and the function can be used.

In this case, the television apparatus 12 on the client side determines that the server apparatus 11 has the audio source separation function, and displays a GUI for performing the audio source separation setting (i.e., for setting the volume of a human voice and the volume of the other voices separately) when a recorded program in the server apparatus 11 is to be played back through the network. Further, in accordance with the user's operation on the GUI display, the audio source separation setting which has been made is transmitted to the server apparatus 11. In this way, the server apparatus 11 can distribute the stream whose volume is adjusted by the audio source separation function to the client television apparatus 12 according to the audio source separation setting sent from the television apparatus 12.

Note that while a case of providing the content through a stream has been described in the above embodiment, this structure can also be implemented in a case where the content is downloaded. Also, when a television apparatus on the client side has the audio source separation function, if a stream of which the volume is adjusted by the audio source separation function that is installed is uploaded to the server apparatus 11, a stream which has gone through audio source separation can be viewed by the other television apparatuses not having the audio source separation function. That is, in this case, the television apparatus provided with the audio source separation function serves as the server apparatus.

Also, in a television apparatus having the above-described audio source separation function, when a stream which has gone through audio source separation by the audio source separation function is uploaded to the server apparatus 11, if the server apparatus 11 has the audio source separation function, the upload may be carried out without adjusting the volume by the audio source separation function on the side of the television apparatus 12.

Further, in the embodiment described above, the server management information is presented from the server apparatus 11 in response to a request from the television apparatus 12 at an early stage. However, the embodiment can similarly be implemented even if this function is configured to be preset in the television apparatus 12 such that the server apparatus 11 is used from the start.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A television system comprising:
    a server apparatus comprising
        a content provider configured to selectively provide a plurality of items of content in accordance with an instruction,
        an audio source separator configured to separate an audio signal of the items of content to be provided into an audio source of a voice component and an audio source of a background sound component by a non-negative matrix factorization process in accordance with an instruction, and to set a volume of each of the audio sources in accordance with an instruction, and
        a management information provider configured to provide a management information for performing an input operation of directing selection of the content to the content provider and an input operation of directing audio source separation processing and volume setting processing to the audio source separator; and
    a television apparatus comprising
        an instruction device connected to the server apparatus through a network, and configured to instruct the content provider of the server apparatus to select the content and to selectively instruct the audio source separator to execute a process for separating the audio sources and setting the volume based on the management information provided from the server apparatus, and
        a reproduction device configured to reproduce the content provided from the server apparatus in response to the instruction, wherein
    in the non-negative matrix factorization process,
    a first basic matrix representing a feature of the audio source of the background sound component is created from a spectrogram of an audio signal in a zone in which a probability that the audio source of the background sound component will be included is high,
    a second basic matrix representing the feature of the audio source of the background sound component is created by excluding a component that is highly related to the audio source of the voice component from the first basic matrix,
    a third basic matrix representing a feature of the audio source of the voice component of the audio signal, and a first coefficient matrix are calculated by using the second basic matrix,
    a spectrogram of the audio source of the voice component is estimated from a product of the third basic matrix and the first coefficient matrix, and
    the audio source of the voice component is separated from the audio signal by converting the estimated spectrogram of the audio source of the voice component into a time signal.

2. The television system of claim 1, wherein the instruction device of the television apparatus comprises a ratio instruction module configured to instruct the audio source separator to set a ratio of the volume of the audio source of the voice component and the volume of the audio source of the background sound component at a ratio specified by a user, and
    the audio source separator of the server apparatus is configured to set the ratio of the volume of the audio source of the voice component and the volume of the audio source of the background sound component at the ratio specified by the ratio instruction module.

3. A server apparatus configured to connect to a television apparatus through a network, the server apparatus comprising:
    a content provider configured to selectively provide a plurality of items of content to the television apparatus in accordance with an instruction from the television apparatus;
    an audio source separator configured to separate an audio signal of the items of content provided to the television apparatus into an audio source of a voice component and an audio source of a background sound component by a non-negative matrix factorization process in accordance with an instruction from the television apparatus, and to set a volume of each of the audio sources in accordance with an instruction from the television apparatus, and
    a management information provider configured to provide management information for performing an input operation of directing selection of the content to the content provider and an input operation of directing audio source separation processing and volume setting processing to the audio source separator wherein
    in the non-negative matrix factorization process,
    a first basic matrix representing a feature of the audio source of the background sound component is created from a spectrogram of an audio signal in a zone in which a probability that the audio source of the background sound component will be included is high, a second basic matrix representing the feature of the audio source of the background sound component is created by excluding a component that is highly related to the audio source of the voice component from the first basic matrix, a third basic matrix representing a feature of the audio source of the voice component of the audio signal, and a first coefficient matrix are calculated by using the second basic matrix, a spectrogram of the audio source of the voice component is estimated from a product of the third basic matrix and the first coefficient matrix, and the audio source of the voice component is separated from the audio signal by converting the estimated spectrogram of the audio source of the voice component into a time signal.

4. The server apparatus of claim 3, wherein the audio source separator sets a ratio of the volume of the audio source of the voice component and the volume of the audio source of the background sound component at a ratio specified by the television apparatus.

5. A television apparatus configured to connect to a server apparatus through a network, the server apparatus comprising a content provider configured to selectively provide a plurality of items of content in accordance with an instruction, an audio source separator configured to separate an audio signal of the items of content to be provided into an audio source of a voice component and an audio source of a background sound component by a non-negative matrix factorization process in accordance with an instruction, and to set a volume of each of the audio sources in accordance with an instruction, and a management information provider configured to provide management information for performing an input operation of directing selection of the content to the content provider and an input operation of directing audio source separation processing and volume setting processing to the audio source separator, the television apparatus comprising:

an instruction device configured to instruct the content provider of the server apparatus to select the content and to selectively instruct the audio source separator to execute a process for separating the audio sources and setting the volume based on the management information provided from the server apparatus; and a reproduction device configured to reproduce the content provided from the server apparatus in response to the instruction, wherein in the non-negative matrix factorization process, a first basic matrix representing a feature of the audio source of the background sound component is created from a spectrogram of an audio signal in a zone in which a probability that the audio source of the background sound component will be included is high, a second basic matrix representing the feature of the audio source of the background sound component is created by excluding a component that is highly related to the audio source of the voice component from the first basic matrix, a third basic matrix representing a feature of the audio source of the voice component of the audio signal, and a first coefficient matrix are calculated by using the second basic matrix, a spectrogram of the audio source of the voice component is estimated from a product of the third basic matrix and the first coefficient matrix, and the audio source of the voice component is separated from the audio signal by converting the estimated spectrogram of the audio source of the voice component into a time signal.

6. The television apparatus of claim 5, wherein when the audio source separator of the server apparatus sets a ratio of the volume of the audio source of the voice component and the volume of the audio source of the background sound component at a specified ratio, the instruction device comprises a ratio instruction module configured to instruct the audio source separator to set the ratio of the volume of the audio source of the voice component and the volume of the audio source of the background sound component at a ratio specified by a user.

* * * * *